UNITED STATES PATENT OFFICE.

FLOYD J. METZGER, OF NEW YORK, N. Y.

PRODUCTION OF FORMATES.

1,313,312.     Specification of Letters Patent.     Patented Aug. 19, 1919.

No Drawing.     Application filed September 6, 1918. Serial No. 252,832.

*To all whom it may concern:*

Be it known that I, FLOYD J. METZGER, residing at New York city, in the county of New York, State of New York, have invented certain new and useful Improvements in the Production of Formates; and I do hereby declare the following to be a full, clear and exact description of the invention, such as will enable others skilled in the art to which it appertains to make and use the same.

In the production of formates, such as sodium formate, it has been proposed to treat cyanid furnace products with steam or water with the resulting formation of ammonia, which escapes in gaseous form, and the production of the formate which remains with the residue. If the cyanid furnace product contains sodium carbonate, this will remain in the residue admixed with the formate and the other constituents thereof. If the cyanid furnace product contains iron, this will also be present in the residue, either in metallic or oxidized form, or in the form of ferrocyanid (to the extent that ferrocyanid is formed during the treatment of the furnace product for the production of ammonia and formate). If both sodium carbonate and iron are present in the cyanid furnace product, the residue will contain both the unchanged sodium carbonate and the iron, or products derived therefrom.

If such a residue, obtained by the treatment of a cyanid furnace product with steam, is leached with water for the extraction of the formate, any carbonate present will be also dissolved and will contaminate the resulting solution. If ferrocyanid is present in the residue when the residue is leached with water, it will also be extracted to a greater or less extent and will contaminate the formate solution. If both carbonate and ferrocyanid are present in the residue these will both be extracted to a greater or less extent by water, and the resulting formate liquor will require to be purified if the formate is to be obtained in a pure state.

The present invention relates to a method of producing and extracting formates, such as sodium formate, from cyanid furnace products, and from residues of the character above referred to, by an improved procedure which results in the obtaining of a relatively pure formate liquor from which a relatively pure formate can be readily obtained. The process of the present invention further provides for the utilization of the residue from which the formate is thus extracted in the further production of cyanid, and with the advantage to the cyanid production that the soda or the iron or both the soda and the iron can be thereby made available in the further cyanid production. The process of the present invention accordingly involves certain features of improvement in the production of cyanids and in the production and recovery of formates from the cyanid furnace products.

In the practice of the invention, the cyanid furnace product may be produced in any suitable manner, for example, by subjecting to the action of nitrogen or a nitrogen-containing gas at a temperature appropriate to the formation of cyanid, a furnace charge made up of carbonaceous material and alkali, together with iron. The carbonaceous material may be in the form of finely divided coke. The alkali is preferably in the form of soda ash. The iron is preferably in the form of a reducible iron compound, such as iron ore or iron oxid. The amount of iron to be used can be varied. In fact, the process can be carried out and cyanid produced to a greater or less extent without the employment of iron, and the furnace product in such case will, of course, be substantially free from iron. When iron is employed it has been heretofore proposed to employ it in relatively large amounts, for example, in amount representing about forty (40) per cent. of the furnace charge. I have found that such large amounts of iron are not necessary, and that an increased yield of cyanid is obtainable with the use of but a small amount of iron, so that the furnace charge is made up for the most part of carbonaceous material and alkali. I have obtained good results with about two (2) per cent. of iron (in the form of a readily reducible iron compound such as iron-oxid or iron ore). This particular amount of iron can, however, be varied and somewhat smaller amounts as well as considerably larger amounts employed. With larger amounts of iron present in the furnace charge there will be a correspondingly increased content of iron in the furnace product.

The cyanid process may thus be carried out with a furnace charge containing about forty-four (44) per cent. of soda ash, fifty-four (54) per cent. of carbonaceous material in the form of coke and about two (2) per cent. of iron (in the form of iron ore or oxid); and by subjecting such furnace charge to the action of nitrogen or a gas consisting essentially of nitrogen at a temperature of around 850° to 1100° C., preferably 1000° to 1100° C. The process can be carried out to advantage in a rotary furnace and in accordance with the procedure more fully described in my prior application, Serial No. 222,812, filed March 16, 1918. The furnace employed may thus be a rotary retort furnace inclined from the horizontal at an angle of about 10 degrees and adapted to be entirely filled with the furnace charge throughout the length of the heated zone of the retort. The retort may be, for example, about 15 inches in diameter with a length of 10 feet thereof exposed to the heating action, and with extensions beyond the heated zone at both ends, and the retort may be made of a material such as an alloy of nickel, chromium and iron, which is resistant to the furnace gases and to the action of the furnace charge. The rotation of the retort during the operation, at a rate of about one revolution per minute, will cause an effective agitation of the contents thereof, without objectionable packing of the charge. The cyanid producing operation may require several hours for its approximate completion, or for its continuation to the desired extent, for example, eight or nine hours in the case of the charge above referred to. The nitrogen gas can be obtained from any suitable source, such as a liquid air apparatus which separates the air into a gas rich in nitrogen and a gas rich in oxygen; and nitrogen of a purity of from 99.5% to 99.9% is thus readily obtainable. The nitrogen is preferably introduced at a rate of about two cu. ft. per minute. If the furnace charge is properly agitated and properly treated, it will yield a furnace product which is granular in character.

The cyanid furnace product thus produced is permitted to cool either in an extension of the rotary retort itself or in a receptacle adapted to receive the product discharged from the retort. In either case the furnace product should be cooled to such a temperature that when it is treated with steam for the production of ammonia and formate, the formate will not be decomposed. The furnace product may, for example, be cooled to a temperature of about 130° to 160° C., or if previously cooled to a lower temperature it should preferably be reheated to about 130° to 160° C. This furnace product is then treated with dry steam of a temperature of about 130° to 140° C., and at a corresponding pressure, for the production of ammonia and formate. The steam can thus be introduced at the pressure and temperature referred to, and the steam supply then shut off, and the evolution of ammonia permitted to take place, with resulting increase in pressure in the apparatus. The ammonia can be drawn off continuously or intermittently; and the treatment of the furnace product with the steam can be repeated or continued until substantially all of the cyanid has been converted into ammonia and formate. When iron is present, it is important to use dry steam, and to avoid the presence of wet steam and water at elevated temperatures, if ferrocyanid formation is to be prevented.

If iron is present in the cyanid furnace product in any considerable amount, and if proper precautions are not taken, for example, if water is present, the iron will react with the cyanid, or with hydrocyanic acid produced therefrom, to produce ferrocyanid. To the extent that the ferrocyanid is formed, the formation of ammonia and formate is prevented. In some cases, as where ferrocyanid is desired, a considerable amount of the cyanid may be converted into ferrocyanid, particularly where a considerable amount of iron is present in the furnace product, and where the treatment of the furnace product for the production of ammonia is at a lower temperature and in the presence of sufficient water to promote the ferrocyanid reaction. But generally such ferrocyanid will be undesirable, and its formation should be prevented as much as possible, by avoiding the presence of wet steam or water during the treatment, as above described.

According to the present invention, the formate-containing residue is leached with a solvent which will give the formate in a relatively pure state and relatively free from such amounts of carbonate and ferrocyanid as the residue contains. Thus, if the residue contains sodium carbonate the formate liquor will be relatively free from sodium carbonate; if it contains ferrocyanid, the formate liquor will be relatively free from ferrocyanid; if it contains both carbonate and ferrocyanid, the formate liquor will be relatively free from both. The leaching solution which is employed in the process of the present invention is preferably a composite solution made up of a mixture of water and an organic solvent soluble therein, such as methyl-alcohol or wood-spirit, denatured ethyl-alcohol, etc. The relative amounts of water and organic solvent may be varied, for example, from twenty to sixty parts of alcohol to eighty to forty parts of water. While both sodium carbonate and ferrocyanid are soluble in water alone, and would be leached out with the formate by the use of water in sufficient amount, the presence of the organic solvent in admixture with the water has the effect of retarding the solution and extraction of both the carbonate and the ferrocyanid, while the composite solvent is nevertheless a good solvent for the formate and will effect its selective extraction, leaving the carbonate and ferrocyanid in the residue.

When sodium carbonate is employed in the furnace charge, the cyanid furnace product will usually contain both unconverted sodium carbonate and also sodium oxid in varying amounts. The sodium oxid will, during the production of ammonia and formate, be converted into the hydroxid. When the residue, containing the unconverted carbonate and hydroxid, is treated with the leaching solution for the extraction of the formate, the hydroxid will also be dissolved. It can be separated from the cyanid solution by subjecting the solution to a carbonating treatment with carbon dioxid or furnace gases, so that the hydroxid will be converted into the carbonate which is relatively insoluble in the solution and which will accordingly be precipitated therefrom. This carbonating treatment may take place after the formate solution has been separated from the residue, but I regard it as more advantageous to effect the carbonation while the solution is still admixed with the residue so that the carbonate will be precipitated prior to the separation of the formate solution, thus leaving the carbonate with the residue and giving a formate solution relatively free therefrom. By proceding in this manner, a formate solution of increased purity is directly obtained, while the precipitated sodium carbonate is left with the residue and is available for return, together with such amounts of unconverted sodium carbonate as the residue may contain to the cyanid furnace where it can be compounded with further amounts of ingredients for the production of cyanids; and this return of the residue may be repeated until its increased contamination, by accumulated ash constituents of the coke and alkaline silicates derived therefrom, make its return no longer profitable. The formate solution, because of its relative freedom from sodium carbonate and caustic soda, as well as from ferrocyanid, yields a formate which is well adapted for use, without further purification, for various purposes, such as the production of formic acid or formic acid esters.

The residue remaining after the extraction of the formate therefrom will be wet with the solvent and inasmuch as the solvent contains an organic solvent constituent this can be recovered by evaporation, for example, by heating or by steaming and by condensation of the vapors given off.

Where the residue contains ferrocyanid in considerable amount, this can be subsequently extracted by the use of water as a solvent, and the ferrocyanid thereby obtained.

The residue, when extraction of ferrocyanid therefrom is not effected, will generally still contain such amounts of carbonate or of iron or of both as to make it of value for further use in the production of cyanid. The carbon content of the residue, where carbonaceous material is present in the original cyanid furnace charge, will also be available for use in the further production of cyanid. This furnace product is accordingly returned to the cyanid furnace with such rectification of its composition as will make it available for use in the further production of cyanid. To the extent that its carbonaceous material, soda and iron, are thus returned, a corresponding reduction can be made in the amounts of these respective constituents to be added. The residue can be repeatedly returned in this manner until its further return is no longer feasible. Thus, if coke is employed as the carbonaceous material, the ash constituents thereof and alkaline silicates produced therefrom, will gradually accumulate, with repeated return of the residue, until they form such a proportion of a residue that the return is no longer profitable.

It will thus be seen that the process of the present invention enables a relatively pure formate to be obtained from cyanid furnace products and from the formate residues in which the formate is produced, while the residue itself retains the valuable constituents, other than the formate, in a form available for use in the further carrying out of the cyanid process in a particularly advantageous manner. It will further be noted that certain of the improvements of the present invention can be used to advantage where certain of the other improvements are not also utilized; for example, the extraction of the formates from products containing them in admixture with various impurities such as carbonates and ferrocyanid involves features of improvement of a more or less general application, even where the impure formate may be produced otherwise than in the particular manner described; while the improvements in the method of producing ammonia and formate from a cyanid furnace product containing iron, by treatment with dry steam to prevent the formation of any appreciable amount of ferrocyanid, is of general application irrespective of the particular method of extraction employed for recovering the formate from its admixed impurities.

I claim as my invention:

1. The method of extracting formates from products containing the same in admixture with carbonates which comprises leaching the formate from such product with a solvent in which the carbonate is insoluble or difficultly soluble, and thereby obtaining the formate relatively free from carbonate.

2. The method of extracting formates from products containing the same in admixture with ferrocyanid which comprises leaching the formate from such product with a solvent in which the ferrocyanid is insoluble or difficultly soluble, and thereby obtaining the formate relatively free from ferrocyanid.

3. The method of extracting formates from products containing the same in admixture with carbonates and ferrocyanids which comprises leaching the formate from such product with a solvent in which the carbonate and ferrocyanid are insoluble or difficultly soluble, and thereby obtaining the formate relatively free from carbonate and ferrocyanid.

4. The method of producing and extracting formates which comprises subjecting a cyanid furnace product containing cyanid and carbonate to the action of steam for the production of ammonia and a formate-containing residue, and leaching the formate from the residue with a solvent in which the carbonate is insoluble or difficultly soluble.

5. The method of producing and extracting formates which comprises subjecting a cyanid furnace product containing iron to the action of steam or water for the production of ammonia and a residue containing formate and ferrocyanid and leaching the formate from the residue with a solvent in which the ferrocyanid is insoluble or difficultly soluble.

6. The method of extracting, or of producing and extracting, formates in accordance with claim 1, which comprises the leaching of the formate with a composite solvent made up of water and an organic solvent soluble therein.

7. The method of producing and extracting formates which comprises subjecting to the action of nitrogen or a nitrogen-containing gas and at a temperature appropriate to the formation of cyanid a furnace charge of carbonaceous material, alkali carbonate and iron; subjecting the resulting furnace product to the action of steam or water for the production of ammonia and formate, and leaching the formate from the resulting product with a solvent in which any remaining carbonate is relatively insoluble and thereby obtaining the formate relatively free from carbonate and leaving the carbonate in the residue available for return and further use in the production of cyanid.

8. The method of producing and extracting formates which comprises subjecting to the action of nitrogen or a nitrogen-containing gas and at a temperature appropriate to the formation of cyanid a furnace charge of carbonaceous material, alkali carbonate and iron; subjecting the resulting furnace product to the action of steam or water for the production of ammonia and formate, and leaching the formate from the resulting product with a composite solvent, comprising water and an organic solvent soluble therein, and thereby obtaining the formate relatively free from carbonate and leaving the carbonate in the residue, and returning the residue for further use in the production of cyanid.

9. The method of producing and extracting formates which comprises subjecting to the action of nitrogen or a nitrogen-containing gas and at a temperature appropriate to the formation of cyanid a furnace charge of carbonaceous material, alkali carbonate and iron; subjecting the resulting furnace product to the action of steam or water for the production of ammonia and formate, leaching the formate from the resulting product with a solvent in which any remaining carbonate is relatively insoluble and thereby obtaining the formate relatively free from carbonate and leaving the carbonate in the residue, and returning the residue, together with such further additions of carbonaceous material alkali carbonate and iron as will rectify the composition thereof, for further use in the production of cyanid.

10. The method of producing and extracting formates from cyanid furnace products which comprises treating such furnace products for the conversion of the cyanid into ammonia and formate, and leaching the formate from the residue with a composite solvent, comprising water and an organic solvent soluble therein.

11. The method of producing formates from cyanid furnace products containing iron which comprises treating such furnace products with dry steam, and with avoidance of the presence of water or condensation of steam for the conversion of the cyanid into ammonia and formate, whereby any appreciable loss of cyanid in the form of ferrocyanid is prevented.

12. The method of improving the production and extraction of formates from cyanid furnace products containing iron which comprises treating such furnace products with steam at a temperature above that at which any of the steam can be condensed and below that of decomposition of the formate and thereby converting the cyanid into ammonia and formate without any appreciable formation of ferrocyanid.

13. The method of improving the production and extraction of formates from cyanid furnace products containing iron which comprises treating such furnace products with steam at a temperature above that at which any of the steam can be condensed and below that of decomposition of the formate and thereby converting the cyanid into ammonia and formate without any appreciable formation of ferrocyanid, and extracting the formate from the resulting product with a composite solvent comprising water and an organic solvent soluble therein, and thereby obtaining the formate relatively free from ingredients insoluble in such a composite solvent.

14. The method of improving the extraction of formate from cyanid furnace products containing the same in admixture with alkali metal oxid which comprises treating such furnace product with steam or water for the conversion of the cyanid into ammonia and formate and the oxid into hydroxid, extracting the formate from the resulting product with a composite solvent comprising water and an organic solvent soluble therein, in which alkali metal carbonate is relatively insoluble, subjecting the resulting solution while still admixed with the residue to a carbonating treatment for the conversion of the hydroxid into carbonate and thereby effecting the precipitation of the carbonate, and separating the formate solution from the residue and precipitated carbonate.

15. The method of improving the production and extraction of sodium formate from sodium cyanid furnace products containing sodium oxid which comprises subjecting such furnace products to the action of steam or water for the conversion of the cyanid into ammonia and sodium formate and the oxid into hydroxid, treating the resulting product with a solvent, containing water and an organic solvent soluble therein, in which sodium formate and sodium hydroxid are soluble but in which sodium carbonate is relatively insoluble, carbonating the resulting solution while still admixed with the residue and thereby precipitating the sodium hydroxid as carbonate, and separating the remaining formate solution from the residue and the precipitated carbonate.

16. The method of improving the production and extraction of sodium formate from sodium cyanid furnace products containing sodium carbonate and sodium oxid, which comprises subjecting such furnace products to the action of steam or water for the conversion of the cyanid into ammonia and sodium formate and the oxid into hydroxid, treating the resulting product with a solvent containing water and an organic solvent soluble therein, in which sodium formate and sodium hydroxid are soluble but in which sodium carbonate is relatively insoluble, subjecting the resulting solution while still admixed with the residue to a carbonating treatment and separating the remaining formate solution from the residue.

17. The method of extracting, or of producing and extracting formates in accordance with claim 2, which comprises the leaching of the formate with a composite solvent made up of water and an organic solvent soluble therein.

18. The method of extracting, or of producing and extracting, formates in accordance with claim 4 which comprises the leaching of the formate with a composite solvent made up of water and an organic solvent soluble therein.

19. The method of extracting, or of producing and extracting, formates in accordance with claim 5, which comprises the leaching of the formate with a composite solvent made up of water and an organic solvent soluble therein.

In testimony whereof I affix my signature.

FLOYD J. METZGER.